United States Patent [19]
Kroyer

[11] Patent Number: 5,630,381
[45] Date of Patent: May 20, 1997

[54] ANIMAL RETENTION DEVICE

[76] Inventor: Thomas Kroyer, 14328 Allen Blvd., Savage, Minn. 55378

[21] Appl. No.: 349,736

[22] Filed: Dec. 5, 1994

Related U.S. Application Data

[63] Continuation-in-part of Ser. No. 172,948, Dec. 27, 1993, abandoned.

[51] Int. Cl.$^6$ ........................................... A01K 29/00
[52] U.S. Cl. ........................................... 119/801
[58] Field of Search ................... 119/801, 802, 119/805; 273/32 F, 162 E; 294/19.1, 19.2, 19.3

[56] References Cited

U.S. PATENT DOCUMENTS

| | | | |
|---|---|---|---|
| 4,046,413 | 9/1977 | Jeninga | 294/19.2 |
| 4,079,978 | 3/1978 | McMullin | 294/19.1 |
| 4,395,840 | 8/1983 | Banks, Jr. | 294/19.1 X |
| 4,508,467 | 4/1985 | Choffin | 294/19.1 X |
| 4,514,004 | 4/1985 | Morgan | 294/19.1 |
| 4,793,646 | 12/1988 | Michaud, Jr. | 294/19.1 |

FOREIGN PATENT DOCUMENTS

| | | | |
|---|---|---|---|
| 204175 | 7/1956 | Australia | 119/802 |
| 43383 | 11/1930 | Denmark | 119/802 |
| 2082037 | 3/1982 | United Kingdom | 119/802 |

*Primary Examiner*—Gene Mancene
*Assistant Examiner*—Thomas Price

[57] ABSTRACT

A device for capture and retention of various animals such as calves, pigs and the like for branding, castration or the like consisting of a formed, open and openable, resilient hooking end of a size to allow positioning about the rear leg of an animal and a rod of an extensible length to allow for manual use.

1 Claim, 1 Drawing Sheet

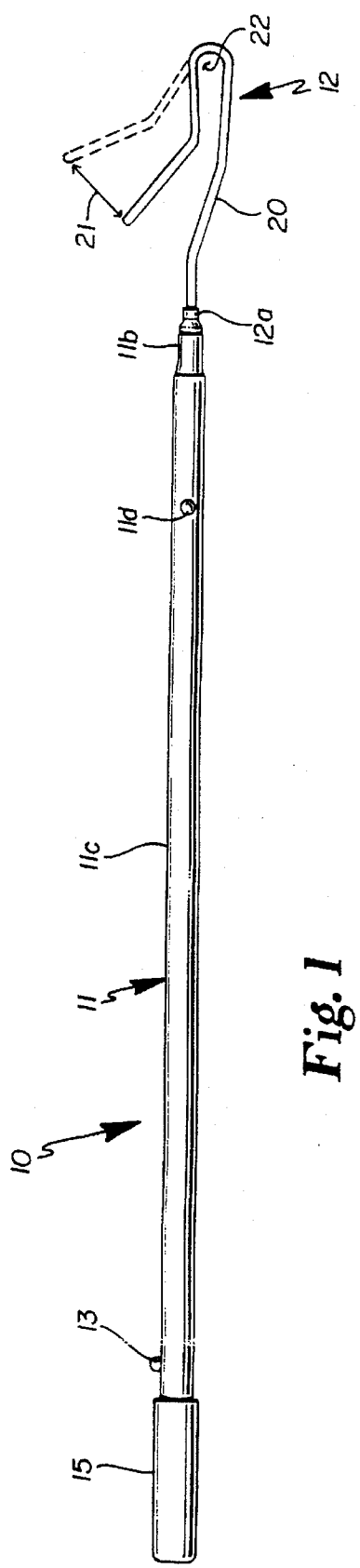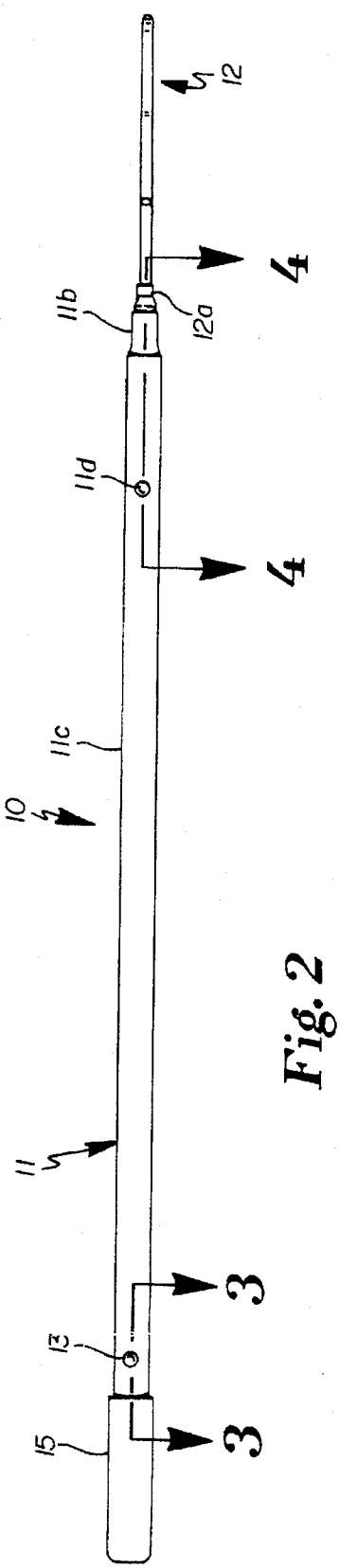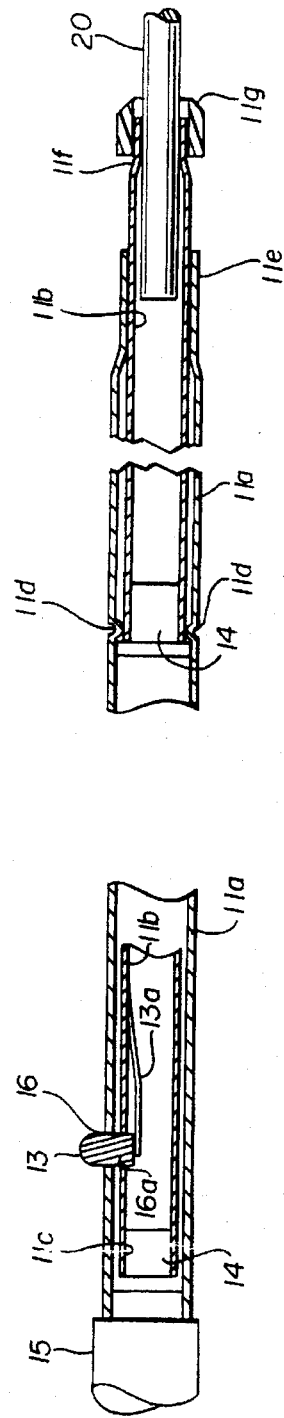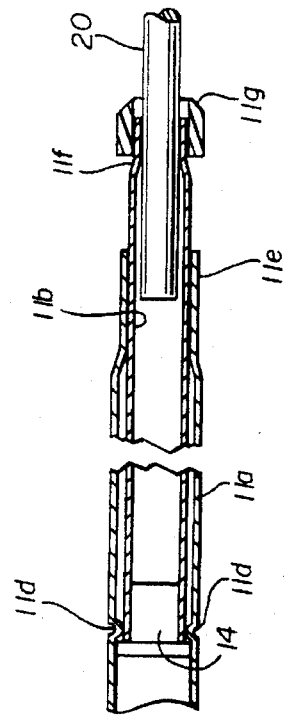

ANIMAL RETENTION DEVICE

FEDERAL SPONSORSHIP

This invention has not been made under any Federal or Indepent Sponsorship arrangements.

RELATED APPLICATIONS

This a Continuation-in-Part of a prior application, bearing the same title, Ser. No. 08/172,948, Filed Dec. 27, 1993, now abandoned. Other than this application, applicant is not aware of any other application that would be pertinent to consideration and prosecution of this application.

FIELD OF THE INVENTION

This invention relates to a specific, extensible, resilient hook device which is utilized for catching and holding of animals such as calves, pigs, sheep and similar livestock such that various operations may be performed on the animal.

BACKGROUND OF THE INVENTION

When working with certain animals, such as pigs, sheep and calves, it is often necessary to see to certain aspects of health of the animal. The applicant has developed a hook device that will catch and hold the animal during such operations. The hook device allows an operator to catch and hold the animal until its release will be allowed by the operator.

The applicant has researched the patentability of his product and has failed to find any similar devices directed to the desired intentions. A similar commercial search has been made and he has found a Canadian company that produces a hooking, retention device but in his opinion, the differences between this disclosed product and their product, as far as he has been able to determine, are substantial and this Canadian unit should not bear on the patentability of his design.

One particular aspect of the invention designed to prevent harm to the animal is the built in, relative rotation arrangment between the inner and outer extensible shaft portions. By allowing the inner hook carrying shaft to rotate with respect to the outer shaft, the animal may turn, roll or otherwise move without moving against a locked hook. This arrangment prevents injury to the animal while still retaining the same and these gyrations are not transferred to the user of the device which could easily twist or otherwise strain the user's hand, wrist and arm.

SUMMARY OF THE INVENTION

An elongated extensible, coaxial tube structure having a resilient hook device at one end of an inner tube member with a handle on the other end of the outer tube, the hook being specifically designed for hooking and holding, preferably, the rear leg of the animal.

The device provides for interchangeability of hooks for various sized animals. The hooks are designed with built-in spring tension to open when being pulled over a part of the animal being caught and which thereafter returns to its normally closed position to hold the animal.

The extensible unit includes a pair of coaxial shafts with stop crimps on the outer tube to act in conjunction with a stop member on the inner tube to prevent over-extension. This stop arrangement allows inner tube rotation with a minimum amount of rotative pressure provided by the animal turning, twisting or rolling so that no harm will come to the animal by fighting or twisting against a stationary hook and similarly these contortive actions will not be transferred back to the user.

OBJECTS OF THE INVENTION

It is an object of the invention to provide an animal hooking device which includes a pair of extensible, coaxial tubes, the inner extensible tube carrying an animal catching and holding, resilient hook, It is a further object of the invention too provide an animal hooking and holding device which provides spring tensioned hooks which open when pulled over a part of the animal but which will thereafter return to a holding position.

It is further object of the invention to provide easily interchangeable hooks for use on various animals.

It is still a further object of the applicant's invention to provide a pair of coaxial, extensibe shafts with the inner such shaft being rotatably contained when in extended position to allow rotation thereof should the hooked animal turn or roll such that such movements will not be made against a held unit which could cause harm to the animal or the user.

These and other objects and advantages will more fully appear from a consideration of the accompanying disclosure and drawings.

DESCRIPTION OF THE DRAWINGS

FIG. 1 is a side elevation of the animal retention device embodying the concepts of the invention and illustrating the shiftability of the hook from a locking or closed, solid line position to an open, dotted line position which illustrates the flexibility thereof to receive an animals leg and retain the same;

FIG. 2 is a view similar to FIG. 1 but rotated 90°;

FIG. 3 is a partial longitudinal section taken along Line 3—3 of FIG. 2 illustrating the locked, non-extended arrangement for the device; and, FIG. 4 is a longitudinal section view taken along Line 4—4 of FIG. 2 illustrating the stop arrangement between the inner and outer tubes and also providing a break in the tubes such that the forwardmost hook holding end of the inner tube may be illustrated.

DESCRIPTION OF THE INVENTION

In accordance with the accompanying drawings the animal retention device is generally designated 10 and includes an tubular unit 11 and a hook 12. Tubular unit 11 includes a pair of coaxially or concentrically arranged, slideagle, tubular members 11a, 11b. The comparative sizes of the outer 11a tube and inner 11b are best illustrated in the partial cross sections of FIGS. 3 and 4 in which it should be noted that the inner tube 11b is smaller so as to be freely slideable within the outer tube 11a.

Basically the inner tube 11b has two sliding engagement points with the inner surface of the outer tube 11a and these consist of, as shown in FIG. 3, a shouldered stop member 14 pressed into the end 11c of inner tube 11b and a swedged end 11e on the outboard end of outer tube 11a. The shouldered stop member 14 is of a size to smoothly slide on the inner surface of outer tube 11a and extends outwardly from the outer surface of inner tube 11b. The outboard end 11e of outer tube 11a is swedged down to provide the second riding surface for the inner tube 11b. Also, as illustrated in FIG. 4, a plurality of inwardly directed dimples 11d are provided in outer tube 11a and as inner tube 11b is extended, these dimples 11d will come into contact with the aforementioned, shouldered stop 14. The plurality of dimples 11d and the swedged section 11e maintain the straight line relation between the two tubes 11a, 11b. It should be noted that FIG. 4 is broken for illustrative purposes but the distance from the swedged area 11e and the dimples 11d is sufficient to maintain axial alignment between the inner 11b and outer 11a tubes and prevent cocking of the inner tube 11b. Abutment of the shouldered stop 14 against the dimples 11d maintain the inner tube 11a within the outer tube 11b while permitting free rotation of the inner tube 11a within the outer tube 11b.

The friction developed between the dimples 11d, stop 14 and the swedged area 11e is sufficient to hold the hook 12 in what would be termed proper horizontal hooking position. Once the animal is hooked, however, the friction is insufficient to prevent rotation between the two tubes, 11a, 11b. This rotational situation is essential to prevent harm to the animal as well as to prevent rotational force transfer to the user which could cause him or her harm if no rotation of tubes 11a, 11b were provided for.

The means for retaining the device in non-extended position is illustrated in FIG. 3. As illustrated therein, an aperture 16 is provided through outer tubular member 11a and a spring loaded button 13, loaded through leaf spring 13a attached to the inner surface of inner tube 11b extends through aperture 16a in such tube 11b such that upon registration of button 13 with aperture 16 a locking situation is provided. Upon depression of button 13 through the outer tube 11a, the inner tube 11b may be advanced forwardly to that position shown in FIG. 4.

Obviously, the unit may be operated in extended or non-extending position but in non-extended, locked position, rotation of the hook 12 and inner tube 11b is not provided for. However the unit is also operable in any position between these limits although applicant has found that, if so operated, an animal will cause full extension simply by running or pulling.

A rubber or cushioned handle end 15 is provided.

Various hooks 12 all of the same shape as the hook illustrated are provided and vary only in size and therefore are not illustrated. These are carried on the forward end of inner rod 11b and are removable therefrom. A typical capturing method is illustrated in FIG. 4. As illustrated therein the inner tube 11b is again swedged down as at 11f to the size to receive the shaft 20 of a hook 12 and threads are formed on shaft 20. A tapered nut 11g is provided to collapse this swedged end 11f against the shaft 20 of hook 12. Other common means for holding round shafts within round members are well known to the are but this is a simple and effective method.

A typical hook 12 is best illustrated in FIG. 1. The hook 12 basically has two components, a shaft 20 and a spring opening or resilient trapping portion 21. The area between such members is the hooking or capturing area 22 and is the area into which the animal is hooked. As illustrated, when an animal is hooked into this area 22, the resiliency and spring tension of the trapping portion 21 of the hook 12 allow an enlarged opening by the spreading of trapping portion to accomodate the size of the animal and after the animal's leg passes into the capture area 22 the unit will return to the solid line retaining position. For animal removal, the operator may simply push the hook 12 from the captured position to cause the hook to respread or may physically spread trapping portion 21 from shaft 20 to release the animal. The trapping portion 21 then operates as a door and a lock.

Although only one hook size is illustrated it should be obvious that the invention is not limited to a single size and explanation has been made for interchange of various hooks which would all employ the same principles.

The dimples 11d prevent further extension of the inner tube 11b with respect to the outer tube 11a and do lock the two elements in axially aligned position and also allow the inner tube 11b to rotate to prevent harming an animal as compared to an animal fighting against a stationary hook. This rotation prevents or reduces the possibilty of such harm.

It should be obvious that the animal retention device includes many aspects of operation for hooking an animmal and this unit may be used for retention of various small animals. The aspect of a certain degree of friction to initially hold a hook in a proper catching, horizontal position and allowing rotation between elements would appear to be new in the art.

It should be obvious that the applicant has provided a new tool that is patentably distinct from prior art units.

What is claimed is:

1. An animal caprture and retention device including:
   a. a longitudinally extendable unit including an inner and an outer tube, said inner tube being limitedly extendable with respect to said outer tube and providing an extending end and an inner end, said outer tube having a forwardmost end and a rear end;
   b. said inner tube being rotatable with respect to said outer tube when in extended position;
   c. hook means carried by and attached to said extending end of said inner tube;
   d. said hook means including a shaft and a resilient trapping portion adjacent thereto to provide an animal capturing area therebetween; and
   e. a button receiving aperture adjacent said rear end of said outer tube, a spring loaded button arranged on said inner tube whereby upon registration of said button with said aperture, said button will pass into said outer tube aperture and lock said tubes in non-extended position.

* * * * *